United States Patent [19]

Hogan et al.

[11] Patent Number: 5,543,103
[45] Date of Patent: Aug. 6, 1996

[54] PROCESS OF SURFACE SHAPING

[76] Inventors: S. David Hogan, 1882 S. West Temple, No. 150B, Salt Lake City, Utah 84115; David A. Parker, 168 N. Moor La., Orem, Utah 84057

[21] Appl. No.: 251,097

[22] Filed: May 31, 1994

[51] Int. Cl.$^6$ ............................................ B23Q 33/00
[52] U.S. Cl. ............... 264/219; 364/474.03; 364/474.05; 409/80; 409/131
[58] Field of Search ............... 409/80, 131; 364/474.03, 364/474.05, 474.08; 264/162, 219

[56] References Cited

U.S. PATENT DOCUMENTS

| | | | |
|---|---|---|---|
| 3,641,872 | 2/1972 | Ulfhielm | 409/80 |
| 4,436,684 | 3/1984 | White | 364/474.05 |
| 4,558,977 | 12/1985 | Inoue et al. | 409/80 |
| 4,575,805 | 3/1986 | Moermann et al. | 364/474.05 |
| 4,867,922 | 9/1989 | Zuccato | 364/474.05 |
| 5,019,993 | 5/1991 | Montalcini et al. | 364/474.03 |
| 5,452,407 | 9/1995 | Crook | 364/474.05 |

FOREIGN PATENT DOCUMENTS

| | | | |
|---|---|---|---|
| 40165 | 11/1981 | European Pat. Off. | 409/80 |
| 61-274852 | 12/1986 | Japan | 409/80 |
| 2197502 | 5/1988 | United Kingdom | 364/474.05 |

Primary Examiner—Robert Davis

[57] ABSTRACT

A process of surface shaping involving creating an accurate three-dimensional depiction of an object; selection a portion of said three-dimensional depiction; and incorporating said selected portion as an integral part of a wall surface.

13 Claims, 5 Drawing Sheets

PROCESS OF SURFACE SHAPING

BACKGROUND OF THE INVENTION

1. Field of the Invention

This invention relates to product surfaces and particularly to the formation of three-dimensional images as an integral component part of such surfaces.

2. State of the Art

It has long been recognized that objects can have three dimensional shapes formed in and projecting from wall surfaces thereof. Cups and drinking glasses, for example, have been formed from ceramics, plastics or glass material molded around or in a mold or master constructed using a pre-formed model. Repeat copies of the model can then be made from the formed master. Various methods have been proposed for making the model from which the master is made. In the past the models used have been slowly created, as by use of machine tools having limited capabilities or by sculpturing, or the like.

With the relatively recent introduction of rapid non-contact digitizers which are capable of scanning complex three dimensional objects, including the human form in high resolution, a significant new technological problem has been created. Shapes that have not been previously available in computer format are being generated, but the existing manufacturing processes and machine tools are incapable of using such format to produce high quality copies, including masters, for use in tooling or the tooling itself with traditional milling and routing machine tools. While high production processes involving injection molding, impact/pressure forming, etc. have been available for many years, these processes require the necessary "G" Code to drive machines that will produce high quality tools, masters, molds, dies, etc. that will produce acceptable end products. Typically, this machine code is generated from computer aided design (CAD) programs which produce the necessary "3D Shape" images. Because the new digitizers generate massive files and complex surface data, they routinely exceed the capacity and capability of existing CAD/CAM software and machine tools to produce the required shapes.

In any event, there has not been a process wherein a complex three dimensional model, such as a human head can be precision formed quickly and easily in a wall surface that itself then becomes the high quality master for repeat article production.

OBJECTS OF THE INVENTION

Principal objects of the present invention are to provide a process including the capability of producing articles having three-dimensional images as a composite portion of a wall surface of an object quickly and accurately from a complex model and to do so using conventionally available machine tools.

Other objects are to utilize the object formed having a wall with a portion of an accurately depicted three dimensional image as an integral, composite portion thereof as a model in the production of multiple copies of the object.

FEATURES OF THE INVENTION

Principal features of the process of the invention include capturing the true surface of an object, even a complex surfaced three dimensional object, as high density, i.e. ½ mm by ½ mm impact image data and then converting and filtering such data to a format that will control a three axis numerically controlled milling/routing machine to produce an image duplicated product that in the past would have typically required a full five axis machine and that still would not have the desired accuracy.

Additional objects and features of the invention will become apparent to a person skilled in the art to which the invention pertains from the following detailed description and drawings.

THE DRAWINGS

In the drawings:

FIG. 1 is a block diagram showing the steps involved in the process of the present invention;

FIG. 2, a schematic diagram showing the steps involved in achieving accurate data imaging that will allow machine operation to form an accurate depiction of even complex subject models;

FIG. 3, a perspective view of a three dimensional image formed into a mold or die suitable for use in producing repeat copies of any selected portion of the image in the wall of a can container;

FIG. 4, a transverse section taken on the plane 4—4 of FIG. 3;

FIG. 5, a perspective view of a plastic bottle container incorporating a three dimensional image of a human head as an integral portion of the wall surface of the container;

FIG. 6, a perspective view of a container having three-dimensional images formed as integral components of flat wall surfaces;

FIG. 7, a perspective view of another type of transparent bottle container with a three-dimensional image formed as an integral component of an inner surface of the wall of the container;

FIG. 8, a transverse section taken on the plane 8—8 of FIG. 7;

FIG. 9, a diagram view showing a method of imprinting a three dimensional image formed according to the teachings of the invention into a receptacle wall;

FIG. 10, another diagram view showing another method of imprinting a three dimensional image formed according to the teachings of the invention into a receptacle wall;

FIG. 11, a perspective view showing a baseball bat with a three dimensional image comprising a portion of the outer wall surface of the bat;

FIG. 12, a block diagram showing typical ways in which the process of the invention can be used to provide products.

DETAILED DESCRIPTION Referring now to the drawings:

Figure 1:
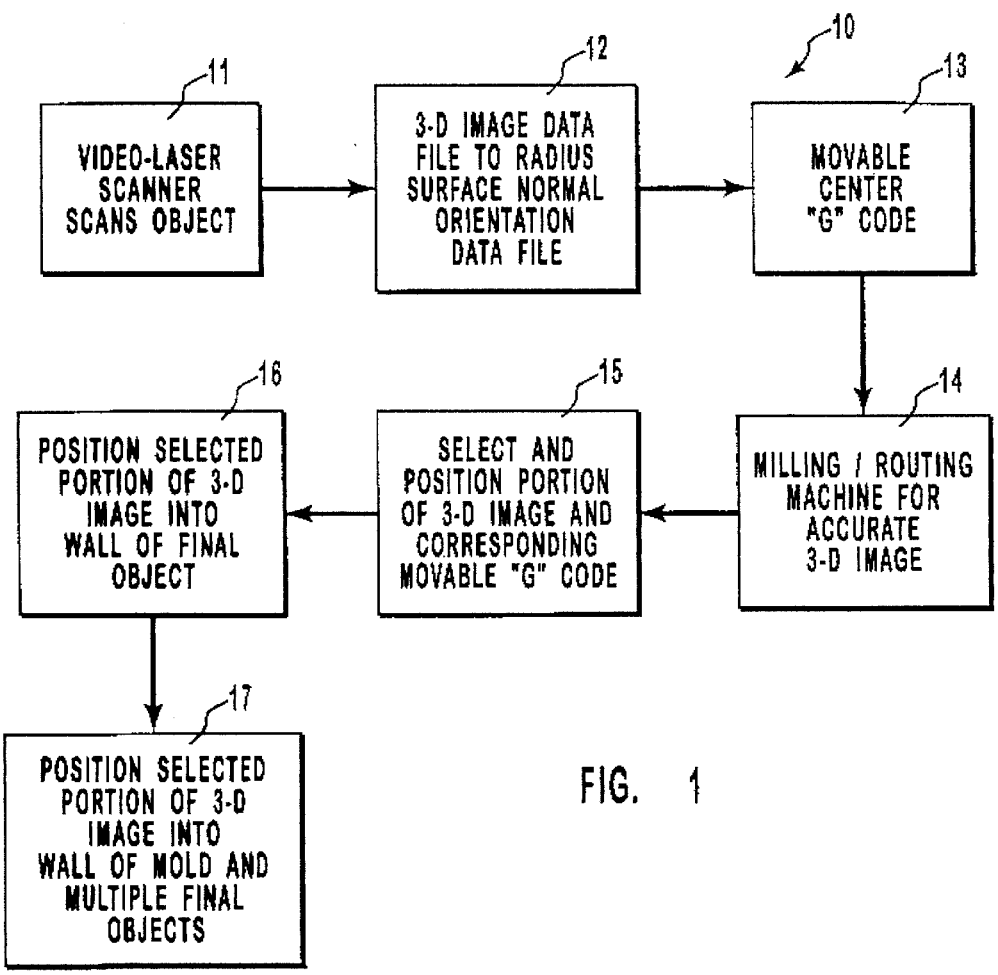
Figure 2:
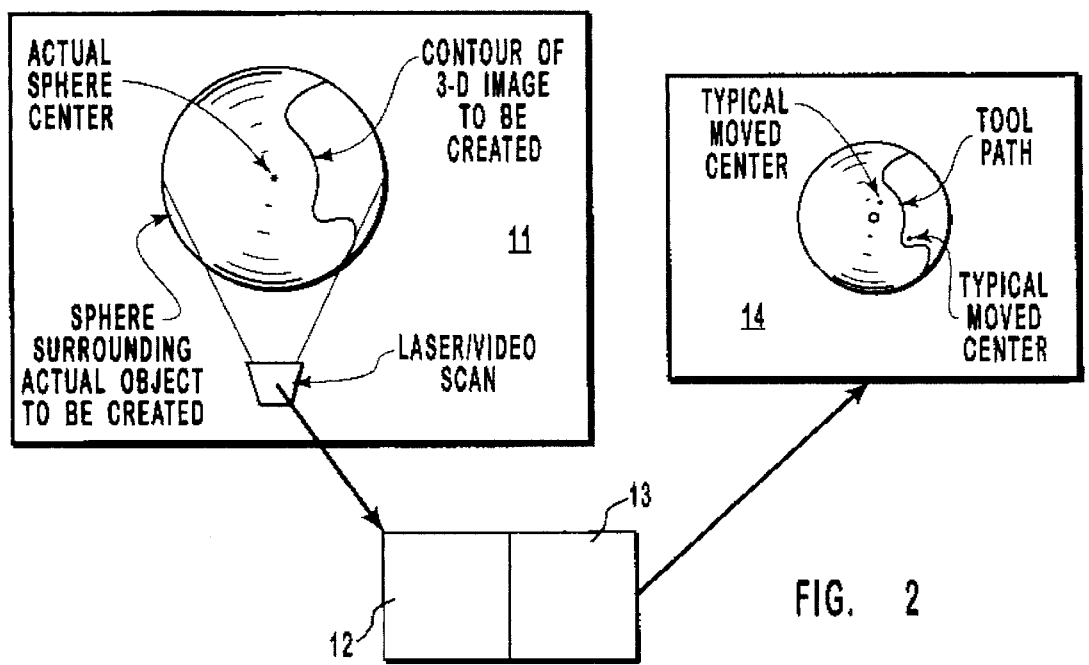

In the illustrated preferred embodiment of the invention the process of surface shaping of the invention is shown generally at 10. The process involves the steps identified in blocks 11–17.

Initially, as shown at block 11 a three-dimensional object is scanned using a video and laser scanner to convert the image to a radius surface normal orientation data file as shown at block 12. This file is used to generate a numerical controlled "G" code using movable curve centers within a sphere as shown at block 13. The "G" code then controls a three axis milling/routing machine to mill the three-dimensional image in cylinderical form as shown at block 14, using a program that insures that the cutting machine is always cutting normal to a radius from one of a very large number of centers located within the sphere enclosing the three dimensional object being shaped. The number of centers required for any three dimensional object being duplicated will vary, depending on the complexity of the object being copied, i.e. dependent upon the extent of shaping that can be accomplished from each located center. In acurately copying the human head, for example it is necessary that the x,y,z coordinates of in excess of 200,000 centers be used and that the cutting and shaping machine used be programmed to operate normal to numerous radii extending from each of such centers.

Once the three dimensional copy has been produced all or a portion of the copy may be positioned to provide the portion of the image desired to be formed as an integral component of a surface of a wall (block 15) and the portion of the "G" code necessary to repeat that desired image portion of the three-dimensional object is used to command the cutting and shaping tool to shape the image into a wall or into a mold having a surface corresponding to a wall (block 16) so that copies of the selected image portion can be made from said mold as an integral portion of the wall. The selected image portion is shaped into the wall so that the selected image portion projects from an outer wall surface, an inner wall surface, or both.

When the selected image portion has been formed into a mold and as part of a wall surface the mold can be used in known fashion (block 17) to repeatedly produce, high quality copies of the selected portion as part of a wall of such diverse objects as aluminum cans, plastic, glass and paper containers, basketballs and a host of other objects.

When the selected image portion is formed directly into a wall it can produce an article having all or a selected portion of the three-dimensional object forming a part of a wall of the object. Objects as diverse as baseball bats, award plaques and lamp bases, as well as many other objects can be formed with a selected image portion forming an integral component of a wall surface of the object. It will be apparent that more than one three dimensional object can be incorporated into a single wall surface, if desired.

Figure 3:
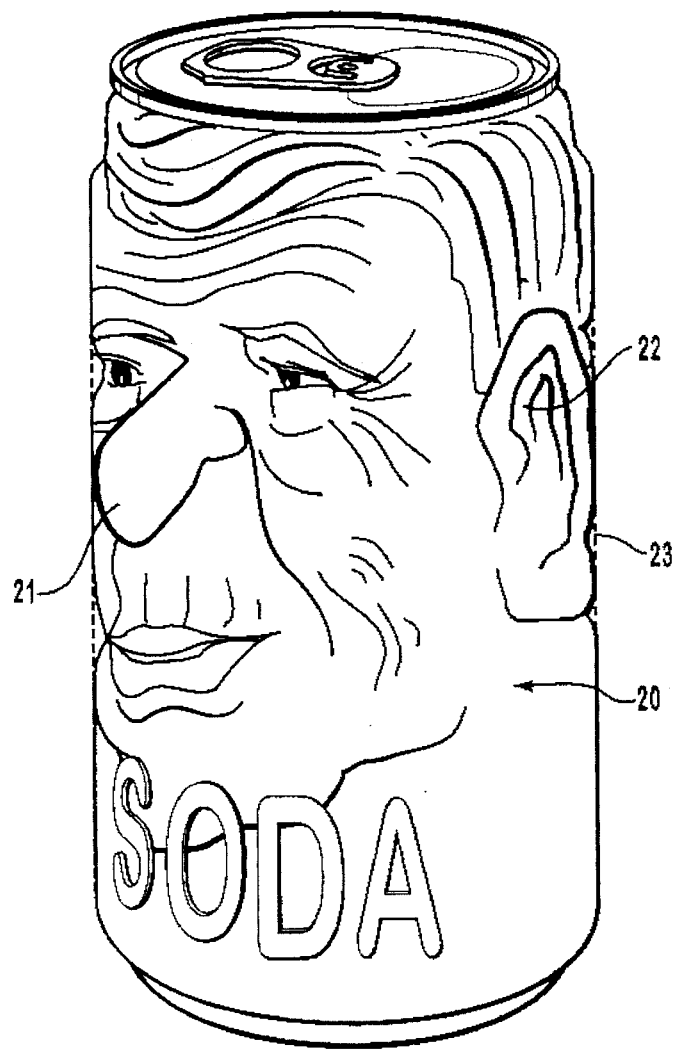
Figure 4:
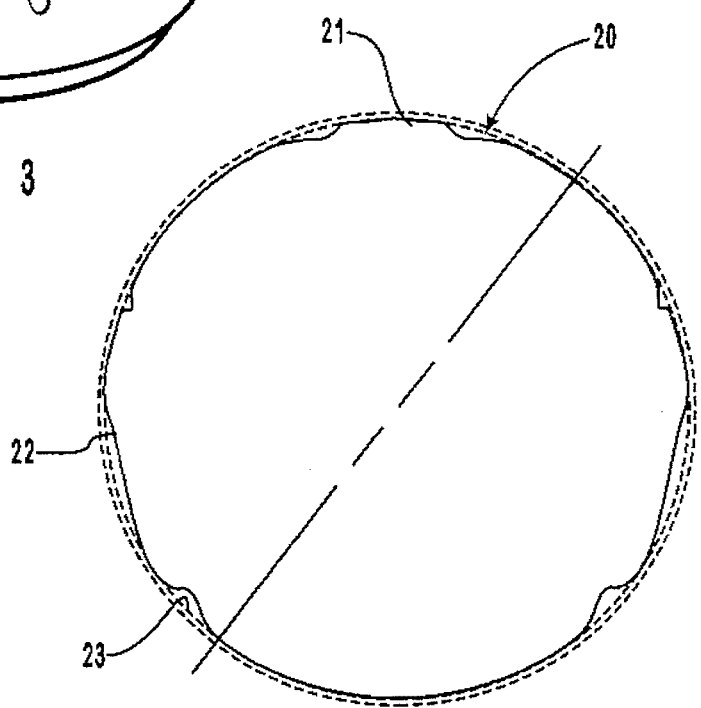

In FIGS. 3 and 4 there is shown a mold 20 comprising a portion of a total three-dimensional model of a human male's head, with the mold 20 formed according to the process heretofore described, from a solid aluminum billet, buffed to a high luster. The mold 20 is sized such that outer extremites thereof, i.e. the projecting nose 21 and ear 22 are in contact with the inner surface of a wall 23 of a superimposed standard aluminum drink can 24 shown in phantom. When the wall of the can is shaped around the mold 20 the can produced will have the portion of the human head formed as an integral component thereof, without enlargement of the can.

Figure 5:
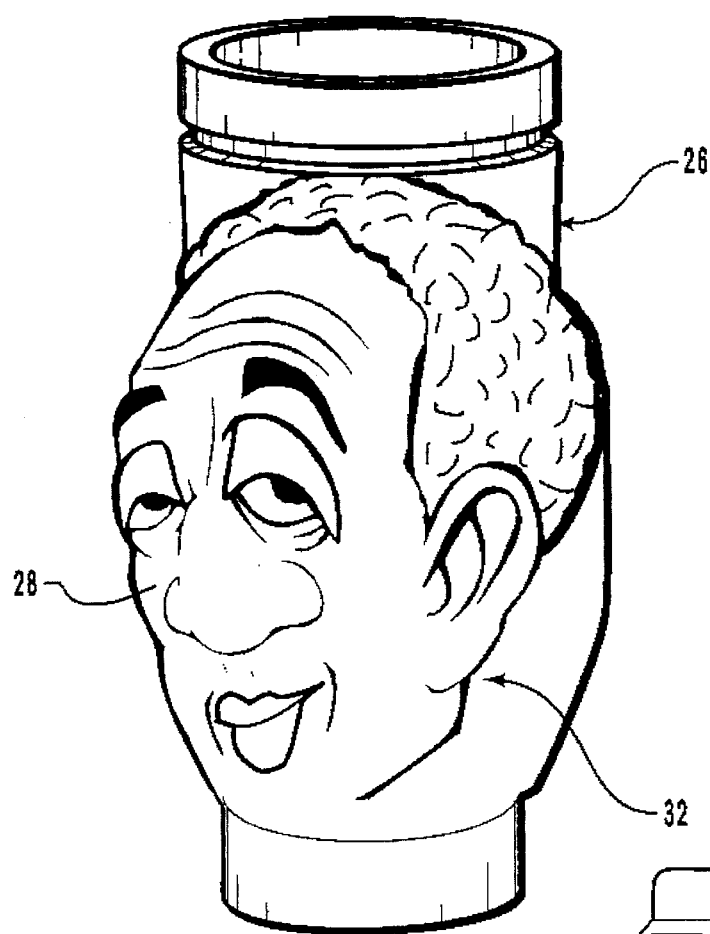

FIG. 5 shows a plastic bottle 26 with a selected portion 26 of a man's head figure 28 forming an integral component of the wall 32 of the bottle. As shown, the selected portion of the total three dimensional image, formed as described in the description pertaining to boxes 11–14 of FIG. 1 is used as a mold around which the bottle 26 is formed. In this case the image component of the wall extends both outwardly and inwardly with respect to the wall proper.

Figure 6:
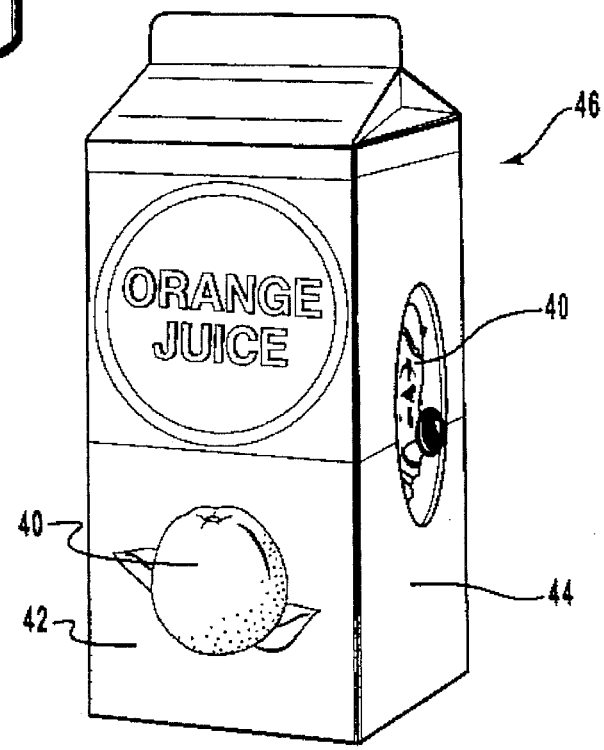

While the containers of FIGS. 4 and 5 have curved wall surfaces with an accurately represented portion of three-dimensional object formed as an integral component of each wall, such an object 40 can as well be incorporated into a flat side wall 42 or 44 of a container 46 as seen best in FIG. 6. The container 46 may be made of plastic or coated paper, for example.

Figure 7:
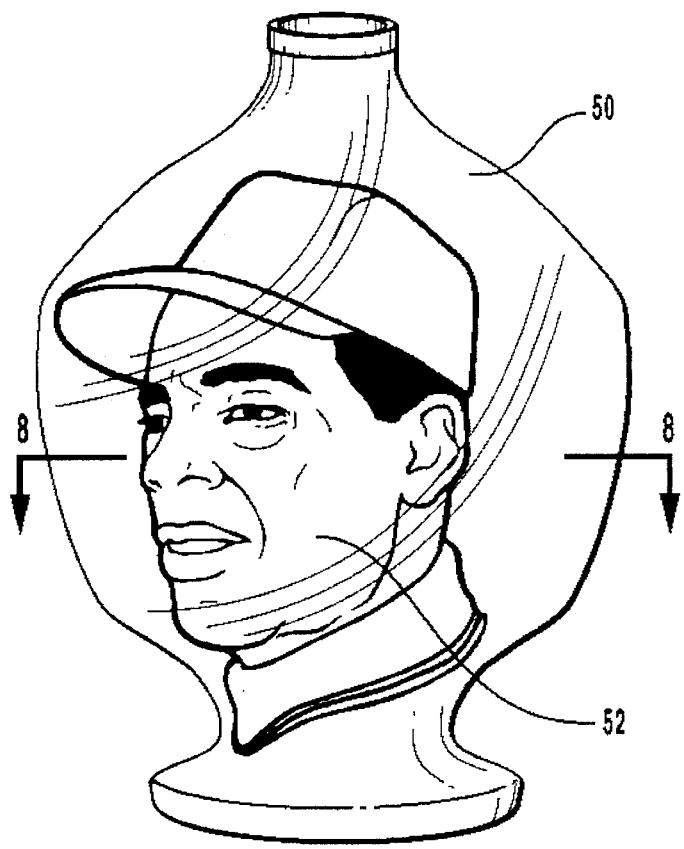
Figure 8:
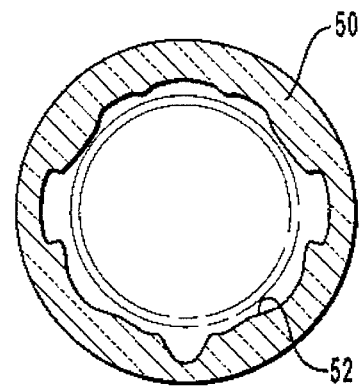

FIGS. 7 and 8 show a transparent curved wall 50 with a selected portion 52 of a three-dimensional object formed integral with the wall and extending into the wall from the inner surface thereof and outwardly into the formed area surrounded by the wall 50. The transparent wall 50 may be part of a lamp base, a jug, or other such structure. If desired, the area within the wall 50 may be provided with a lamp illuminate the wall, including the portion 52 formed integrally therewith.

Figure 9:
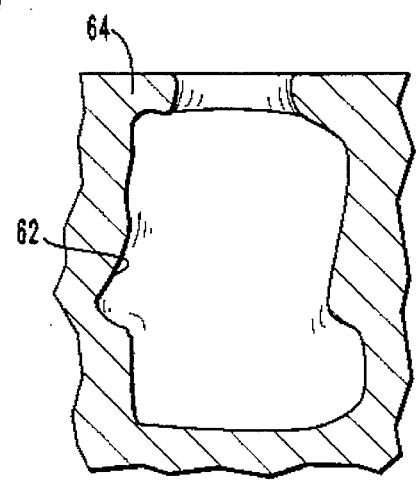

FIG. 9 shows how a selected portion 60 of an accurately formed three-dimensional image 62 is incorporated into a die 64 used in a standard can forming operation. In this operation an aluminum pellet 66 is dropped into the die and is subjected to extreme pressure, causing it to expand and form a can wall against the interior of the die while incorporating the portion of the three dimensional image into the formed can wall.

Figure 10:
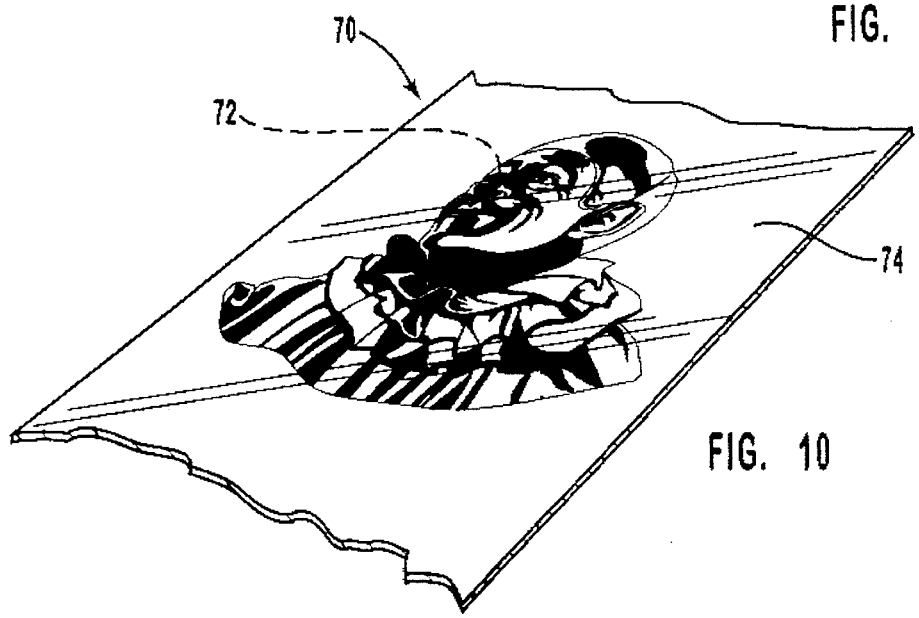

FIG. 10 shows another way for making a cylinderical can wall 70 incorporating a selected portion 72 of an accurate three-dimensional object as an integral component of the can wall. As shown, a length of material 74 from which the can wall 70 is to be made is passed over the formed and positioned portion 72 of the three-dimensional object and is rolled and pressed over the portion to imprint the portion as an integral part of the can wall. The formed can wall is then rolled through a silk screening process, a bottom is swedged on, the container is filled and a top is swedged on to seal the container.

Figures 11, 12:
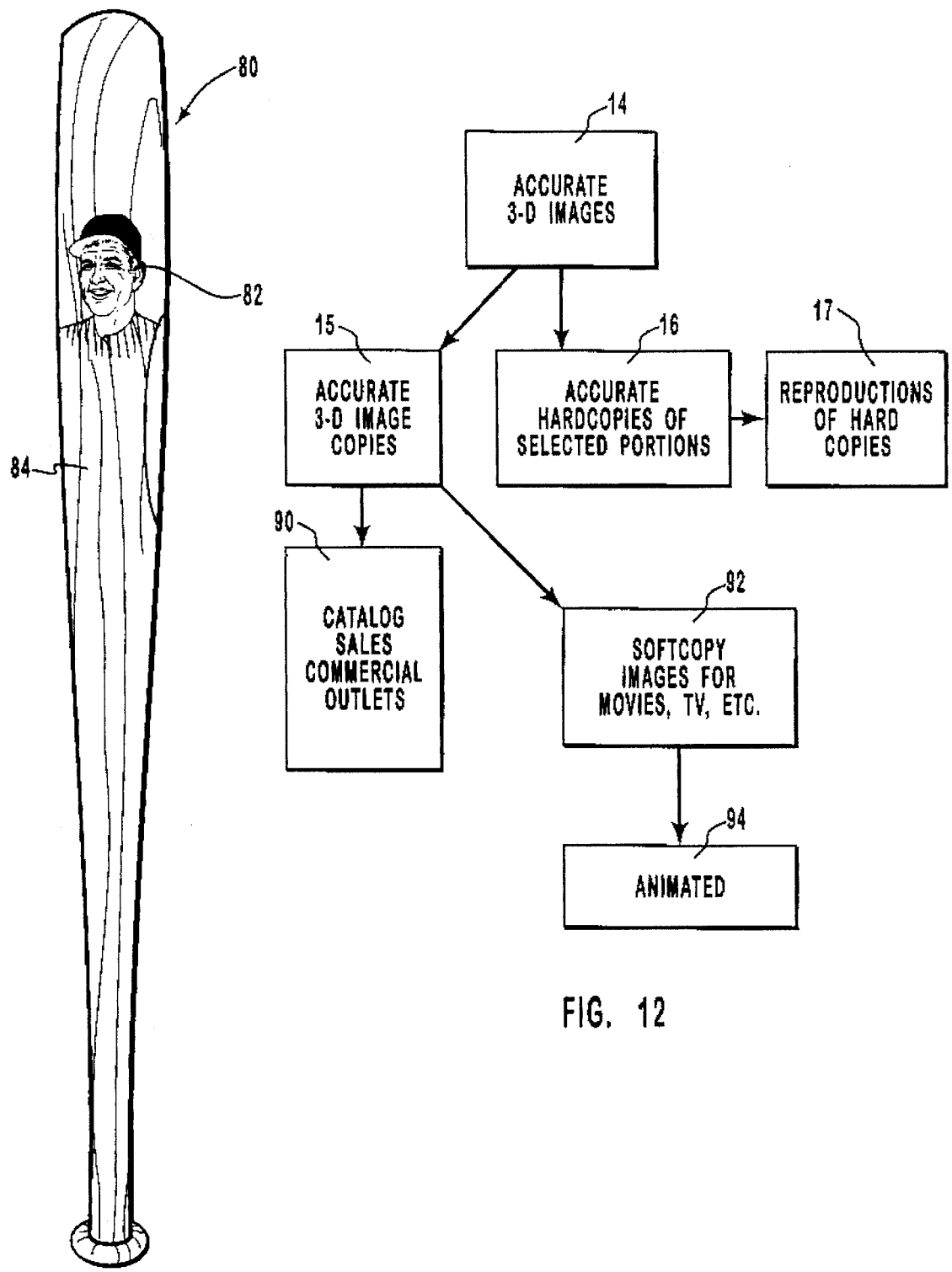

FIG. 11 shows a baseball bat 80 with a selected portion of an accurate three-dimensional image 82 formed as an integral component of the wall surface 84 of the bat. According to the process of the invention, an accurate three-dimensional image (not shown in FIG. 11) has been formed in the manner disclosed in connection with boxes 11 to 14 (FIG. 1) and the selected portion 82 of the accurate total image formed has been selected to be positioned relative to the outer surface of the bat 80 (box 15, FIG. 1) and the selected image portion has been formed as an integral component of the bat wall by cutting the portion into the wall surface 84, using machine tools in the manner heretofore described, with the tools working normal to radii generated from movable centers within the sphere enclosing the object to be copied, i.e, a human head. In this case repeat copies of the baseball bat are produced by programming the cutting and shaping machines to repeat the shaping steps on additional baseball bats.

From FIG. 12 it can be seen that the process of the present invention can be used to produce accurate total images that themselves have commercial value and that, for example, can be sold through catalogs 90 or from commercial outlets. In addition, portions of the accurate total images can be incorporated into wall surfaces in the manner described and the wall surfaces can be reproduced, even as wall surfaces of such well known commercial products such as cans, bottles, lamp bases, and baseball bats. The numbers and types of wall surfaces with which selected portions of an accurate total image are, in fact, essentially unlimited. In addition the accurate total images and selected portions of the total images can be used to provide soft copy images 92 that can be readily animated 94 for use in making movies, advertisements, and television, for example.

It will be apparent that other known processes can be used to form objects incorporating the selected portion of the accurately duplicated three-dimensional image as an integral component of a wall of the object.

While various products have been heretofore disclosed as having walls suitable for having the portion of an accurately depicted image formed as in integral and composite part of the wall it will be apparent that virtually any wall surface, whether of a solid object or a hollow object can have the portion of the accurately depicted image formed therein. Examples of other objects that can have walls formed as described include balls, motorcycle gas tanks and helmets.

While a preferred embodiment of the invention has been herein disclosed variations are possible and the invention is intended to be commensurate with the scope of the following claims.

I claim:

1. A process of surface shaping that incorporates at least a portion of an accurately formed three-dimensional image as an integral component of a wall surface of an object, comprising the steps of
   (a) forming an accurately depicted three-dimensional image of a first object using a method of moving center points with radii extending therefrom within a sphere enclosing said first object and operation of shaping tools to shape normal to said radii;
   (b) selecting a portion of said accurately depicted three-dimensional image to become an integral component of a second object wall; and
   (c) forming said selected portion of said accurately depicted three-dimensional image into an object wall of said second object, as an integral part of said wall.

2. A process as in claim 1 further including the step of
   (d) using the second object having a portion of the accurately depicted three dimensional image as an integral portion of the object wall as a mold in the formation of duplicate objects.

3. A process as in claim 1, wherein the object wall is a container wall.

4. A process as in claim 3, wherein the container wall is a curved wall.

5. A process as in claim 4, wherein the container wall is the wall of a can.

6. A process as in claim 3, wherein the object wall is flat.

7. A process as in claim 6 wherein the object wall is the wall of a box.

8. A process as in claim 1, wherein the selected portion of the accuratedly depicted three-dimensional image projects inwardly from an outer surface of the wall.

9. A process as in claim 1, wherein the selected portion of the accurately depicted three-dimensional image projects outwardly from an outer surface of the wall.

10. A process as in claim 1, wherein the selected portion of the accurately depicted three-dimensional image projects both inwardly and outwardly from an outer surface of the wall.

11. A process as in claim 1, wherein the object wall is an outer wall of a solid object.

12. A process as in claim 11, wherein the object wall is an outer surface of a baseball bat.

13. A process of surface shaping comprising the steps of
   (a) forming an accurately depicted three-dimensional image of a first object;
   (b) selecting a portion of said accurately depicted three-dimensional image to become an integral component of a wall of a second object; and
   (c) forming said portion of said accurately depicted image into a wall of a second object as an integral part of said wall.

* * * * *